(12) United States Patent
Nilsson et al.

(10) Patent No.: US 8,897,382 B2
(45) Date of Patent: Nov. 25, 2014

(54) METHOD FOR DETERMINING PRECODING WEIGHTS

(75) Inventors: Andreas Nilsson, Goteborg (SE); Frederik Athley, Kullavik (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 120 days.

(21) Appl. No.: 13/816,927

(22) PCT Filed: Aug. 16, 2010

(86) PCT No.: PCT/EP2010/061905
§ 371 (c)(1),
(2), (4) Date: Feb. 13, 2013

(87) PCT Pub. No.: WO2012/022372
PCT Pub. Date: Feb. 23, 2012

(65) Prior Publication Data
US 2013/0142271 A1    Jun. 6, 2013

(51) Int. Cl.
*H04L 1/02* (2006.01)
*H04B 7/06* (2006.01)
*H04B 7/04* (2006.01)

(52) U.S. Cl.
CPC ............ *H04B 7/0456* (2013.01); *H04B 7/0695* (2013.01); *H04B 7/0639* (2013.01); *H04B 7/0634* (2013.01); *H04B 7/0452* (2013.01); *H04B 7/0617* (2013.01)
USPC ........................................ 375/267

(58) Field of Classification Search
USPC .......... 375/260, 267, 285, 295; 370/328, 332, 370/334; 455/102–103
See application file for complete search history.

(56) References Cited

U.S. PATENT DOCUMENTS

| | | | |
|---|---|---|---|
| 7,359,734 B2 * | 4/2008 | Ylitalo | ........................ 455/562.1 |
| 7,548,527 B2 * | 6/2009 | Hamalainen et al. | .......... 370/335 |
| 2011/0059703 A1 * | 3/2011 | Hugl et al. | ........................ 455/73 |
| 2013/0121269 A1 * | 5/2013 | Nammi et al. | ................. 370/329 |

FOREIGN PATENT DOCUMENTS

| | | |
|---|---|---|
| EP | 2141825 A1 | 1/2010 |
| WO | 2008009157 A1 | 1/2008 |
| WO | 2008157692 A2 | 12/2008 |
| WO | 2010086715 A1 | 8/2010 |

* cited by examiner

*Primary Examiner* — Khanh C Tran
(74) *Attorney, Agent, or Firm* — Rothwell, Figg, Ernst & Manbeck, P.C.

(57) ABSTRACT

The present invention relates to a method for determining precoding weights between a base station and one user equipment in a communication network. The base station is provided with an antenna structure having multiple antennas, and the antenna structure provides coverage in a coverage area. The precoding weights are stored in a codebook available to the base station and the user equipment. The method comprises: selecting to use a part of the coverage area; determining, at the base station, a subset of precoding weights stored in the codebook generating at least one precoding beam within the selected part of the coverage area; and informing the one user equipment of the determined subset of precoding weights generating the at least one precoding beam within the selected part of the coverage area.

9 Claims, 5 Drawing Sheets

METHOD FOR DETERMINING PRECODING WEIGHTS

CROSS REFERENCE TO RELATED APPLICATION(S)

This application is a 35 U.S.C. §371 National Phase Entry Application from PCT/EP 2010/061905, filed Aug. 16, 2010, designating the United States, the disclosure of which is incorporated herein in its entirety by reference.

TECHNICAL FIELD

The present invention relates to a method for determining precoding weights in a communication system, especially in a MIMO or MISO system with reconfigurable antennas.

BACKGROUND

Precoding is a kind of beamforming that supports multi-layer transmission in MIMO radio systems. Simulations have shown that precoding increases the performance of wireless communication systems and it has therefore been included in the standardization of LTE. In precoding, each of the multiple streams are emitted from the transmit antennas at the base station with independent and appropriate weighting per each antenna such that the throughput is maximized between the base station and the User Equipment (UE). The precoding weights may be calculated at the UE and then the UE informs the base station which precoding weights that should be used.

Usually, only a limited number of predefined precoding weights are used, which are stored in a codebook. The codebook is known both at the base station and the UE, so when the UE informs the base station which precoding weights that should be used, the UE only needs to send a number (index) corresponding to the place that the precoding weights have in the codebook. This number is usually called Precoding Matrix Indicator (PMI). The more antennas that are used at the base station, the more precoding weights are needed in the codebook. Future wireless communication system will probably use 8 or more antennas at the base station, which will need a quite large codebook.

There are several issues with a large codebook: the calculation of which precoding weights to use becomes time consuming and energy consuming; many bits must be send from the UE to the base station to inform which precoding weights to use; there is a larger probability that precoding weights corresponding to "un-physical" precoding vectors are chosen. Therefore, there is a need for reducing the size of the codebook by removing these un-physical precoding vectors from a predetermined codebook whenever possible.

Future wireless systems will use reconfigurable antennas at the base station, to increase the capacity of the communication network and save energy. Two important features of reconfigurable antennas are that they can change the pointing direction of the beams and the beam width for an antenna port, and thereby the radiation pattern and the coverage area of the base station.

Different precoding weights will generate precoding beams in different directions. However, with reconfigurable antennas the beams of the antenna elements at the base stations will be changed over time. If the precoding beams that are created by the precoding weights are pointing in another direction than the radiation pattern of the antenna elements, the antennas will become mismatched and very little part of the power supplied to the antennas will be transmitted.

SUMMARY OF THE INVENTION

An object with the present invention is to provide a method to improve the probability to use precoding weights, when communicating between a base station and user terminals, generating at least one precoding beam within a selected coverage area of a base station compared to prior art methods.

This object is achieved by a method for determining precoding weights between a base station and at least one user equipment in a communication network. The said base station is provided with an antenna structure of multiple antennas providing coverage in a coverage area. The precoding weights are stored in a codebook available to the base station and the at least one user equipment. The method comprises: selecting to use a part of the coverage area; determining, at the base station, a subset of precoding weights stored in the codebook generating at least one precoding beam within the selected part of the coverage area; and informing the at least one user equipment of the determined subset of precoding weights generating the at least one precoding beam within the selected part of the coverage area.

An advantage with the present invention is that fewer bits have to be sent from the UE to the base station to inform which precoding weights to use.

Another advantage with the present invention is that fewer calculations have to be done at the UE to find the optimal precoding weights, which saves energy and time.

Still another advantage with the present invention is that there is a smaller probability that precoding weights generating precoding beams outside the selected coverage area are chosen, which will increase the performance.

Further objects and advantages may be found by a skilled person in the art from the detailed description.

BRIEF DESCRIPTION OF DRAWINGS

The invention will be described in connection with the following drawings that are provided as non-limited examples, in which.

DETAILED DESCRIPTION

Figure 1:
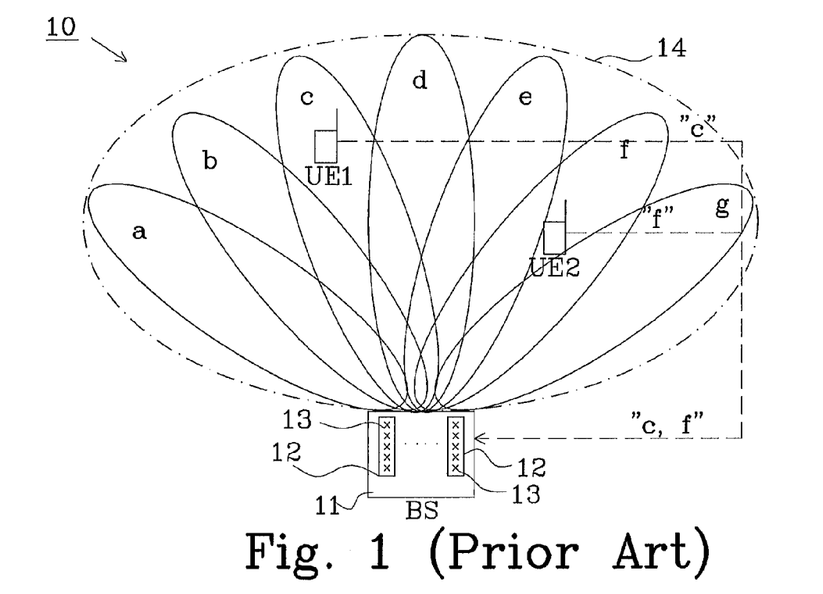
FIG. 1 shows a prior art communication system.

FIG. 1 shows a prior art communication network 10 illustrated by a base station 11 (BS) having an antenna structure with multiple antennas 12, which may be reconfigurable antennas, and two user equipment UE1 and UE2. Each antenna 12 of the BS have equal radiation pattern 14, i.e. coverage area, and comprises multiple antenna elements 13. However, if reconfigurable antennas are implemented the radiation patterns can be changed due to the reconfigurability of the antennas. The narrow beams a-g are precoding beams that are generated when the precoding weights in the precoding codebook are applied. Each precoding beam corresponds to one index in the codebook for single-layer transmissions, and for multi-layer transmission one index in the codebook represents several precoding beams. The antenna structure of the BS generates precoding beams in different directions in response to applied precoding weights within the coverage area 14.

Each user equipment UE1, UE2 listens and determines the preferred precoding weights to be used when communicating with the BS. This information is thereafter transmitted to the BS using an index identifying the precoding weights in the codebook. In this example UE1 transmits the index "c", identifying the precoding weights that generate the third precoding beam, to the BS. Similarly, UE2 transmits "f", identifying the precoding weights that generate the sixth precoding beam, to the BS. The BS thereby obtains knowledge of which precoding weights that preferably should be used when communicating with UE1 and UE2, respectively.

The basic concept of the invention is to reduce the amount of information transmitted between the UE's and the BS, but if the complete coverage area of the BS is used it is not possible to reduce the size of the codebook. Therefore, the inventive method is only applicable when a reduction of the coverage area has been made, either by selecting to use a part of the available coverage area as illustrated in connection with FIG. 2 or by changing the coverage area using reconfigurable antennas as illustrated in connection with FIGS. 3-7.

Figure 2:
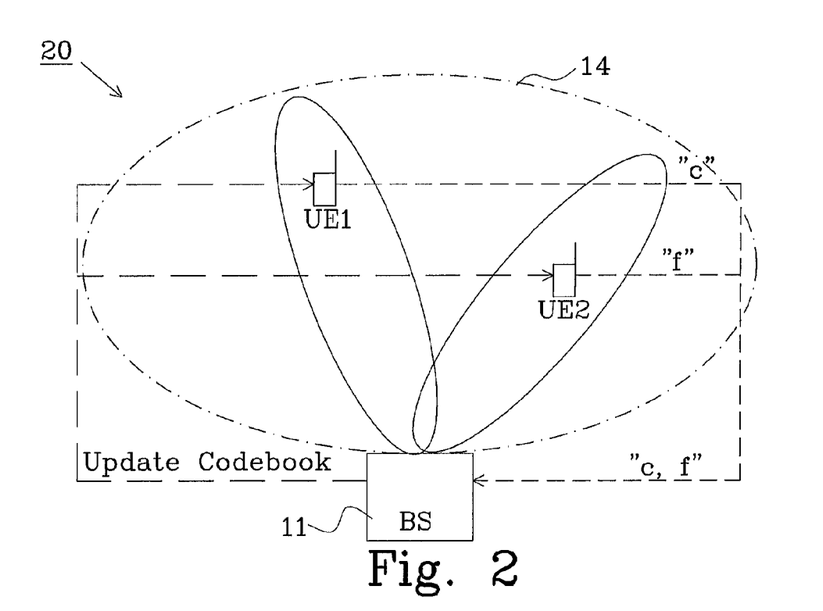
FIG. 2 shows a first embodiment of a communication system according to the invention with a maintained coverage area of the base station.

FIG. 2 shows a first embodiment of a communication network 20 implementing the inventive method of determining precoding weights. The communication network 20 comprises, in addition to the prior art system described in connection with FIG. 1, new functionality at the BS 11.

The basic requirement to use a part of the coverage area is preferably performed by selecting the antenna structure to limit the coverage area to predefined part, and may in this case this be achieved in two ways:

i) for each user equipment UE1, UE2, identify preferred precoding weights "c", "f", and inform the BS 11 of said preferred precoding weights; and the selection to use a part of the coverage area is based on the information of the preferred precoding weights "c", "f" provided by the user equipments, or ii) each antenna 12, with corresponding radio chains and feeder cables (not shown), is calibrated and the selection to use a part of the coverage area 14 is based on the coverage provided by each calibrated antenna 12 to provide coverage for the user equipments UE1, UE2.

The new functionality of the BS 11 includes determining a subset of precoding weights stored in the codebook that generates one or more precoding beams c, f within the selected part of the coverage area 14. However, the determined subset of precoding weights needs to be known to the BS, UE1 and UE2 in order to achieve communication using precoding beams c and f with reduced signalling, and the BS therefore needs to inform the user equipments UE1 and UE2 of the determined subset of precoding weights generating the precoding beams c and f within the selected part of the coverage area. If the codebook is indexed, i.e. the precoding weights are determined to correspond to at least one index, the available indexes are transmitted to each user equipment. Preferably, an updated indexation of the codebook is made and forwarded to UE1 and UE2 as illustrated in FIG. 2.

Thus, in this example, the number of available precoding beams is limited by limiting available precoding weights in the codebook to precoding weights generating two precoding beam c and f within the selected part of the coverage area 14. The coverage area 14 of the antenna structure is unchanged (as indicated by the dash-dotted line), but the available precoding beams c and f restrict the power to be used in the selected part of the coverage area 14 where UE1 and UE2 are present.

Figure 3:
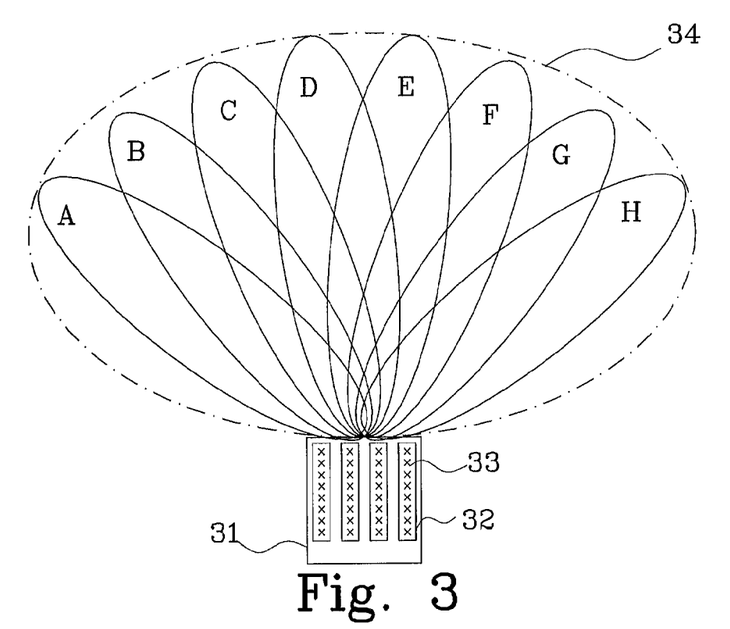
FIG. 3 shows a base station in a communication system with an antenna structure having a coverage area and precoding beams within that coverage area suitable for implementing the invention.

FIG. 3 shows a base station 31 in a communication system with an antenna structure having a coverage area 34 and in this example eight precoding beams A-H within that coverage area 34 suitable for implementing the invention. The antenna structure comprises in this embodiment four reconfigurable antennas 32, each having a plurality of antenna elements 33. Each antenna have equal radiation patterns corresponding to the coverage area 34, but in contrast to the system described in connection with FIG. 1, the radiation pattern of the antennas 32 can be changed due to the reconfigurability of the antennas. The narrow beams (precoding beams) A-H are beams generated by the precoding weights, preferably arranged in a codebook and each beam corresponds to one index in the codebook, i.e. a number corresponding to precoding weights using a Precoding Matrix Indicator (PMI) as is obvious for a skilled person in the art.

Figure 4:
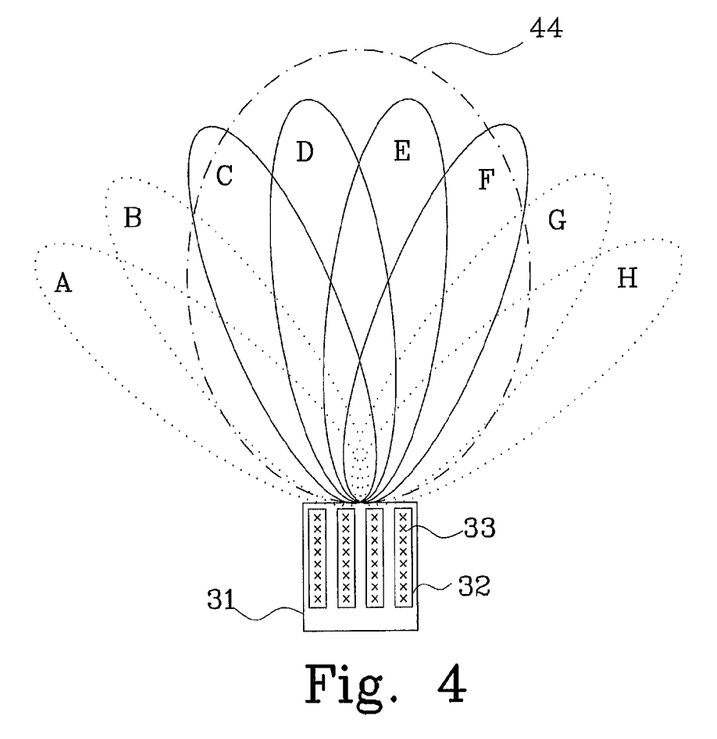
FIG. 4 shows a base station with an antenna structure having a smaller coverage area than in FIG. 3 which is suitable for implementing the invention.

FIG. 4 shows the base station 31 with an antenna structure having a smaller coverage area than in FIG. 3. The radiation pattern 44 of the reconfigurable antenna 32 has been changed to a smaller beam width. Due to the smaller beam width, the precoding beams A, B, G and H will be unusable clue to that they are pointing outside the radiation pattern 44 of the antenna structure. In this case the codebook can be reduced to only containing the beams C-F. This will lead to:

only two bits are used for the PMI feedback from the UE (not shown) to the BS 31 instead of three bits;

much less calculations have to be done at the UE (not shown) to find the optimal precoding weights, which saves energy and time;

there is a smaller probability that wrong precoding weights could be chosen due to e.g. channel estimation errors, which could lead to severe performance degradation.

The concept relies upon the radiation pattern/coverage area 44 is correct, and it is assumed that the antenna element 33 radiation pattern is known by some characterization or calibration. An alternative could be to determine feasible precoding weights/PMIs based on statistics of reported PMIs from the UEs (not shown).

Figure 5:
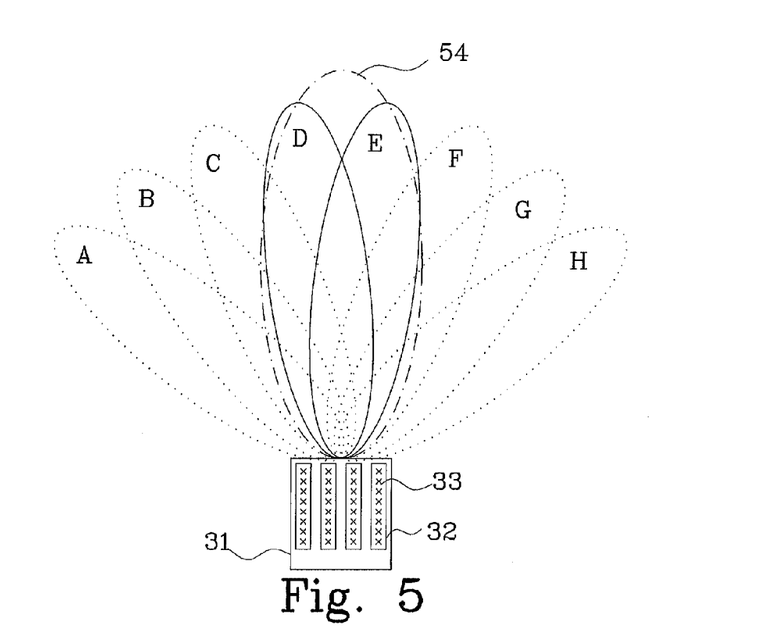
FIG. 5 shows a base station with an antenna structure having an even smaller coverage area than in FIGS. 3 and 4, which is suitable for implementing the invention.

FIG. 5 shows the base station 31 with an antenna structure having an even smaller coverage area than in FIGS. 3 and 4. The radiation pattern 54 of the reconfigurable antennas 32 has been changed to an even smaller beam width. Due to the smaller beam width, the precoding beams A-C, and F-H will be unusable due to that they are pointing outside the radiation pattern 54 of the antennas. In this case the codebook can be reduced to only contain the precoding beams D and E.

Figure 6:
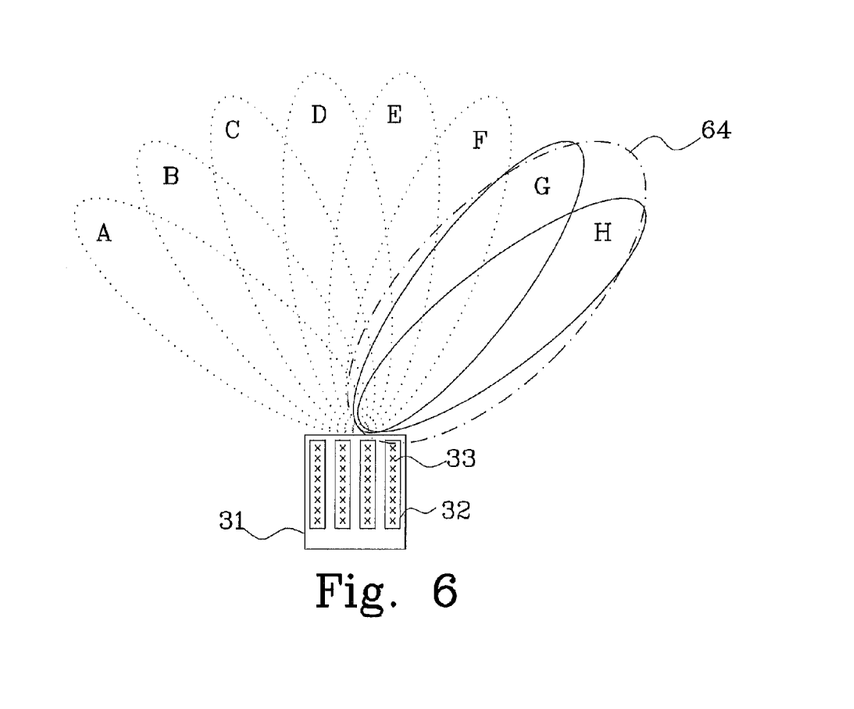
FIG. 6 shows a base station with an antenna structure having an alternative coverage area compared to FIG. 5, which is suitable for implementing the invention.

FIG. 6 shows the base station 31 with an antenna structure having an alternative coverage area 64 compared to FIG. 5. The radiation pattern 64 of the reconfigurable antennas 32 has been changed to another pointing direction compared to the radiation pattern in FIG. 5. This causes the precoding beams A-F to be unusable due to that they are pointing outside the radiation pattern 64 of the antennas 32. In this case the codebook can be reduced to only containing the precoding beams G and H.

Figure 7:
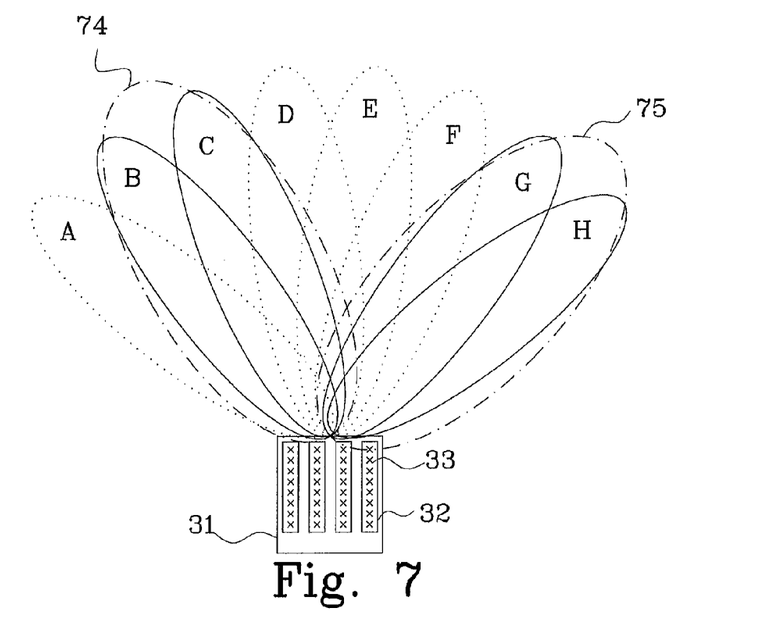
FIG. 7 shows a base station with an antenna structure having a coverage area divided into two parts, which is suitable for implementing the invention.

FIG. 7 shows the base station with an antenna structure having a coverage area divided into two parts 74 and 75. The radiation pattern of the antennas 32 has been changed to also include precoding beams B and C compared to FIG. 6. This causes the precoding beams A and D-F to be unusable due to that they are pointing outside the radiation pattern 74, 75 of the antennas 32. In this case the codebook can be reduced to only containing the precoding beams B, C, G and H.

Figure 8:
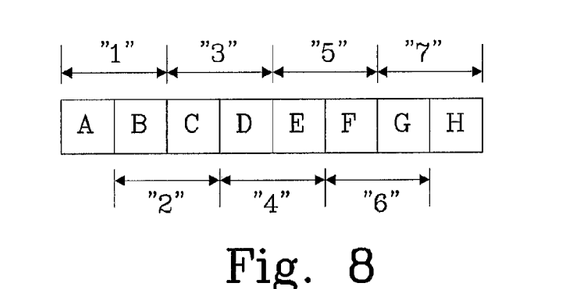
FIGS. 8 and 9 shows examples of indexing different antenna configurations to be used according to the inventive method.
Figure 9:
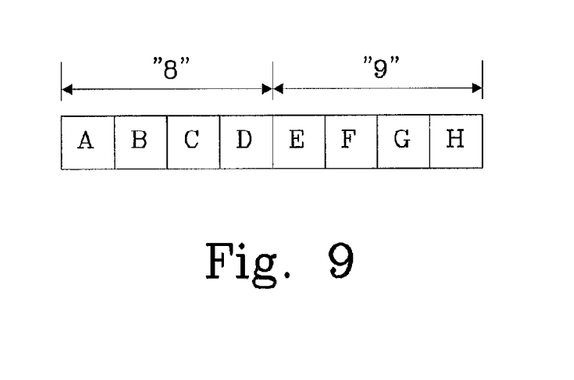

FIGS. 8 and 9 show examples of indexing different antenna configurations that could be used when the BS informs the UEs (not shown) of available precoding weights.

FIG. 8 illustrates predetermined antenna configurations in which precoding weights generating adjacent precoding beams, e.g. A and B, are indexed by "1". Similarly, adjacent precoding weights generating precoding beams B and C are indexed by "2". These predetermined antenna configurations are also stored in the codebook available to both BS and UE and when a coverage area corresponding to parts 74 and 75 in FIG. 7 is selected at the base station, only two indexes need to be used to inform the UEs (not shown) of available precoding beams B, C, G and H, namely indexes "2" and "7", but it is still necessary to use two bits for the PMI feedback from the UE (not shown) to the BS 31 since four precoding beams are available.

In case when three adjacent precoding beams should be used, e.g. precoding beams D-F, only indexes "4" and "5" need to be communicated to the UEs (not shown) to indicate which precoding beams are available.

FIG. 9 illustrates further predetermined antenna configurations in which precoding weights generating four adjacent precoding beams, e.g. A-D, are indexed by "8". These are used as illustrated in FIG. 8.

The main purpose of using predetermined antenna configurations is that the antennas may be set to a predetermined configuration to provide coverage for present user equipment, and the user equipment is informed of the predetermined configuration in addition to the determined precoding weights.

In the above described embodiments, a subset of the precoding weights is determined at the base station, and the user equipment is informed of the subset. However, it is possible to construct a codebook having at least two separate sets of precoding weights (similar to having separate sets of codebooks), and the step of selecting a subset comprises selecting one of the separate sets from the codebook.

For instance, it is possible to have four separate sets of precoding weights, wherein a first set indicates precoding weights generating all precoding beams with in the largest possible coverage area produced by the antenna structure, such as precoding beams a-g in FIG. 1. A second set indicates precoding weights generating precoding beams a and b; a third set indicates precoding weights generating precoding beams c-e; and a fourth set indicates precoding weights generating precoding beams f and g.

Figure 10:
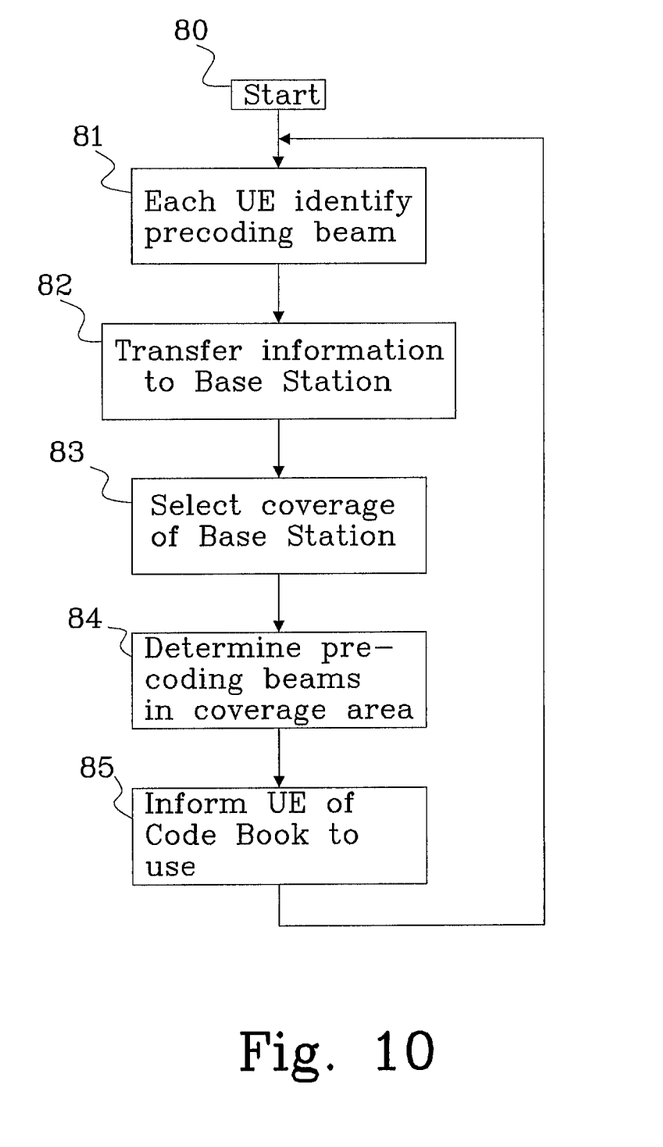
FIG. 10 shows a flow chart illustrating the inventive method.

FIG. 10 shows a flow chart illustrating the inventive method for determining precoding weights between a base station and at least one user equipment in a communication network as described above. The antenna structure of the base station provides coverage in a coverage area, and precoding weights are known to the base station and each user equipment, preferably stored in a codebook.

The flow starts at step 80, and at step 81 each user equipment (UE) identifies precoding weights corresponding to a preferred precoding beam. Thereafter, each UE transfers information to the base station in step 82. This information may or may not be used when selecting coverage of the base station in step 83, as previously mentioned.

In step 83, a part of the coverage area is selected at the base station, preferably by changing the radiation pattern of the antennas using reconfigurable antennas. The flow continues to step 84, in which a subset of precoding weights stored in the codebook is determined at the base station. The subset of precoding weights generates at least one precoding beam within the selected part of the coverage area.

Each UE is thereafter informed of the determined subset of precoding weights generating the precoding beam(s) within the selected part of the coverage area in step 85.

In case the information from the user equipment is used to determine the subset of precoding weights, the flow is fed back to step 81.

If reconfigurable antennas are used, the base station knows the beam width and beam pointing direction of the reconfigurable antennas and can therefore find out which precoding beams that are pointing within these reconfigurable antenna beams. The base station updates the codebook to only contain the usable (available) precoding beams, which means that the updated codebook is a subset of the original codebook. The base station then informs the UE which sets of precoding weights that are used in the updated codebook.

It should be mentioned that the communication system preferably is a MIMO or a MISO system. Furthermore, the invention is applicable to non-reconfigurable antennas as well as reconfigurable antennas, as illustrated above. The minimum number of antennas at the base station is two antennas.

The inventive method is applicable to a base station with reconfigurable antennas in which the beam pointing direction and/or beam width is/are changed at an arbitrary frequency, e.g. once every second or once every year. The beam width and beam pointing direction may be changed using electrical or mechanical means, as is well known for a skilled person in the art.

The number of narrow beams (i.e. precoding beams) within a selected radiation pattern preferably is within the range of one to sixteen (1-16).

The new functionality of the base station, i.e. determining a subset of precoding weights in response to a selected part of the coverage area and informing the user equipment of the subset, is implemented in a processing unit which has access to the precoding weights are stored in a memory. If the selecting of a part of the coverage area is based upon information received from the user equipment, this functionality is also implemented in the processing unit.

The user equipment must also be able to reduce the useable precoding weights, e.g. by updating the codebook, when informed by the base station.

ABBREVIATIONS

BS Base Station
LTE Long-Term Evolution
MIMO Multiple-Input Multiple-Output
PMI Precoding Matrix Indicator
MISO Multiple Input Single Output
UE User Equipment

The invention claimed is:

1. A method for determining precoding weights between a base station and at least one user equipment in a communication network, said base station comprising an antenna structure including multiple antennas, said antenna structure providing coverage in a coverage area, said precoding weights are stored in a codebook available to the base station and the at least one user equipment, the method comprising:

calibrating each antenna, with corresponding radio chains and feeder cables;

selecting to use a part of the coverage area by setting the antennas to a predetermined configuration based on the coverage provided by each calibrated antenna to provide coverage for the at least one user equipment;

determining, at the base station, a subset of precoding weights stored in the codebook generating at least one precoding beam within the selected part of the coverage area; and informing said at least one user equipment of the predetermined configuration and the determined subset of precoding weights generating said at least one precoding beam within the selected part of the coverage area.

2. The method according to claim 1, wherein the step of selecting to use a part of the coverage area further comprises selecting the antenna structure to limit the coverage to said part of the coverage area.

3. The method according to claim 1, wherein said antenna structure generates precoding beams in different directions in response to applied precoding weights, said method further comprises limiting available precoding weights in the codebook to precoding weights generating said at least one precoding beam within the selected part of the coverage area.

4. The method according to claim 1, wherein the method further comprises: for each user equipment, identifying preferred precoding weights, and informing the base station of said preferred precoding weights; and the step of selecting to use a part of the coverage area is based on the information of the preferred precoding weights provided by said at least one user equipment.

5. The method according to claim 1, wherein the codebook comprises at least two separate sets of precoding weights; and the step of selecting a subset comprises selecting one of said separate sets from the codebook.

6. The method according to claim 1, further comprising selecting said communication system to be a MIMO system or a MISO system.

7. The method according to claim 1, further comprising selecting said multiple antennas of the base station to be reconfigurable antennas, whereby the coverage area of the base station may be changed over time.

8. The method according to claim 1, wherein the codebook is indexed and the precoding weights determined in the determining step corresponds to at least one index, and wherein the informing step comprises transmitting said at least one index to said user equipment.

9. A base station configured to communicate with at least one user equipment in a communication network, said base station comprising an antenna structure including multiple antennas, said antenna structure providing coverage in a coverage area, and precoding weights generating precoding beams are stored in a codebook available to the base station and the at least one user equipment wherein the base station is configured to calibrate each antenna, with corresponding radio chains and feeder cables, and to select to use a part of the coverage area by setting the antennas to a predetermined configuration based on the coverage provided by each calibrated antenna to provide coverage for the at least one user equipment, and the base station is further configured to determine a subset of precoding weights stored in the codebook generating at least one precoding beam within the selected part of the coverage area, and to inform said at least one user equipment of the predetermined configuration and said determined subset of precoding weights generating said at least one precoding beam within the selected part of the coverage area.

* * * * *

UNITED STATES PATENT AND TRADEMARK OFFICE
CERTIFICATE OF CORRECTION

PATENT NO. : 8,897,382 B2  
APPLICATION NO. : 13/816927  
DATED : November 25, 2014  
INVENTOR(S) : Nilsson et al.

Page 1 of 1

It is certified that error appears in the above-identified patent and that said Letters Patent is hereby corrected as shown below:

On the Title Page, in Item (75), under "Inventors", in Column 1, Line 2, delete "Frederik" and insert -- Fredrik --, therefor.

In The Specification

In Column 4, Line 33, delete "clue" and insert -- due --, therefor.

In The Claims

In Column 8, Line 19, in Claim 9, delete "equipment" and insert -- equipment, --, therefor.

Signed and Sealed this
Sixteenth Day of August, 2016

Michelle K. Lee
*Director of the United States Patent and Trademark Office*